United States Patent [19]

Exner et al.

[11] 4,273,011
[45] Jun. 16, 1981

[54] DEVICE FOR TURNING THE NUTS ON STUDS FOR CLOSING A PRESSURE VESSEL

[75] Inventors: Gerhard Exner; Volfango Festinori, both of Berlin, Fed. Rep. of Germany

[73] Assignee: Kraftwerk Union Aktiengesellschaft, Mülheim, Fed. Rep. of Germany

[21] Appl. No.: 97,798

[22] Filed: Nov. 26, 1979

[30] Foreign Application Priority Data

Nov. 30, 1978 [DE] Fed. Rep. of Germany ....... 2852105

[51] Int. Cl.³ ............................................. B25B 29/02
[52] U.S. Cl. .................................................. 81/57.38
[58] Field of Search ......................................... 81/57.38

[56] References Cited

U.S. PATENT DOCUMENTS 3,877,326  4/1975  Kock et al. ........................ 81/57.38
4,047,456  9/1977  Scholz ................................ 81/57.38
4,185,504  1/1980  Ethor et al. ........................ 81/57.38

Primary Examiner—James L. Jones, Jr.
Attorney, Agent, or Firm—Kenyon & Kenyon

[57] ABSTRACT

In a device for turning a nut on one stud or tensioning bolt of many, arranged on a pitch circle, the nut is connected to one half of a positive, torque-transmitting clutch which can be pulled apart in the axial direction. The other half of the clutch is supported on a drive bushing carried on the stud or tensioning bolt, being moveable thereon in the lengthwise direction. The upper end of the drive bushing is connected to a gear which meshes with the pinion of an electric motor mounted on the outside of the support body of the device. When the nut is screwed off of a stud, it is contained in the drive bushing in such a way that no extra elevation is not required.

7 Claims, 2 Drawing Figures

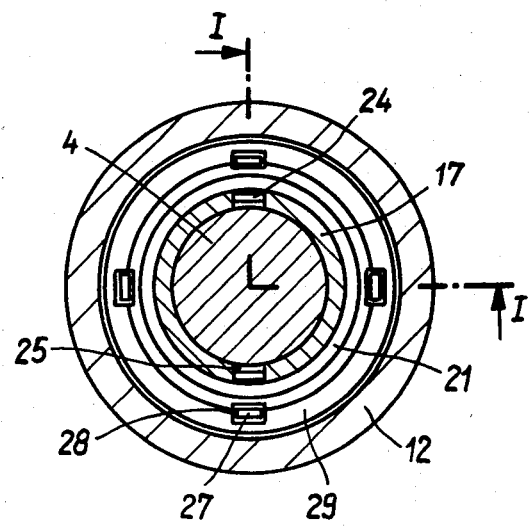

DEVICE FOR TURNING THE NUTS ON STUDS FOR CLOSING A PRESSURE VESSEL

BACKGROUND OF THE INVENTION

1. Field of the Invention

This invention relates to a device for turning the nuts and/or tensioning nuts of several studs arranged on a pitch circle for closing a pressure vessel, especially a reactor pressure vessel. More particularly, the invention relates to tensioning assemblies having separate or unitary support bodies which provide space for receiving such nuts together with studs and, if applicable, tensioning bolts, and to which separate turning units and, more particularly, reversible electric motors, are fastened. Each such turning unit drives a pinion meshing with teeth on a drive bushing which is supported in the support body, surrounds the stud or tensioning bolt and transmits the torque to the nut.

2. Discussion of the Prior Art

A tensioner of this kind is described in German Patent No. 22 58 859 and corresponding U.S. Pat. No. 3,877,326. There a tightening nut being screwed onto a stud is set in rotation by the pinion of a turning unit in such a way that the latter meshes with the external teeth of a drive bushing. Internal teeth in the drive bushing engage external teeth on the nut. The drive bushing is supported axially and radially in the support body of the device. The presence of such external teeth on the nut weakens its cross-sectional strength. In addition, the drive bushing is difficult to manufacture due to the internal and external teeth.

It is, therefore, an object of the invention to make possible the transmission of torque to the entire circumference of a nut or tensioning nut without the use of external gearing on the nut.

BRIEF DESCRIPTION OF THE INVENTION

According to the invention, this problem is solved in a device of the type described above by connecting the nut, or the tensioning nut, as the case may be, (hereafter, simply referred to as the nut), clutch or coupling to one half of a positive, torque-transmitting coupling or clutch which can be pulled out in the axial direction, and the other half of which is supported and movable in the lengthwise direction on the drive bushing, while being secured against relative rotation. The drive bushing is guided, in turn, on the stud or tensioning bolt and carries, at the end facing away from the nut, external teeth which mesh with the pinion.

Such a device has the advantage of using parts of simple design. The nut for example, is a cylindrical body without external teeth, in a manner known in the art. The drive bushing is, likewise, a cylindrical body which is guided on the stud or tensioning bolt, as appropriate, so that it centers itself when it is put on. Furthermore, the drive bushing carries external teeth, at the end facing away from the nut or tensioning nut, and the height of the teeth need only to correspond with the height of the meshing pinion teeth. A positive clutch serves to connect the drive bushing to the nut and has two halves which are pushed inside each other in the axial direction and then transmit the torque regardless of the direction of rotation. Since the half of the clutch which is connected to the drive bushing is carried thereon and is movable in the lengthwise direction, the further advantage is also obtained that the nut can slide lengthwise over the drive bushing. Thus, no additional height of support body need be provided for turning the nut off the thread of the study. The nut can therefore be screwed on or off in one operation.

It has also been found to be advantageous to provide the outer surface of the clutch half which is connected to the nut, with a thread, which, at the end position of the nut, e.g., when it is screwed off the stud or the tensioning bolt, is brought into engagement with a counterthread arranged on the inside of a ring loosely disposed in the support body. This provides, in a very simple way, for transport protection of the nut, when it is screwed off the thread of the stud or tensioning bolt. This is possible because the nut slides over the drive bushing with its radially outermost surface opposite the inside surface of the support body. The nuts are therefore prevented from falling out of the device when the latter is being transported.

For the design of the positive, torque-transmitting clutch, it is particularly advantageous to provide the clutch half supported by the drive bushing with radially inward extending dog (driver) arms which engage longitudinal slots in the drive bushing. These dog arms secure the clutch half against rotation relative to the bushing, so that the torque is transmitted, while, at the same time, the lengthwise motion of the clutch half relative to the drive bushing is permitted by the engagement in longitudinal slots. To reduce friction forces, it is further advantageous to provide the dog arms with roller (anti-friction) elements.

BRIEF DESCRIPTION OF THE DRAWINGS

FIG. 2 is a view, in cross section, of the apparatus of FIG. 1, taken along the lines II—II.

DETAILED DESCRIPTION OF THE INVENTION

Figure 1:
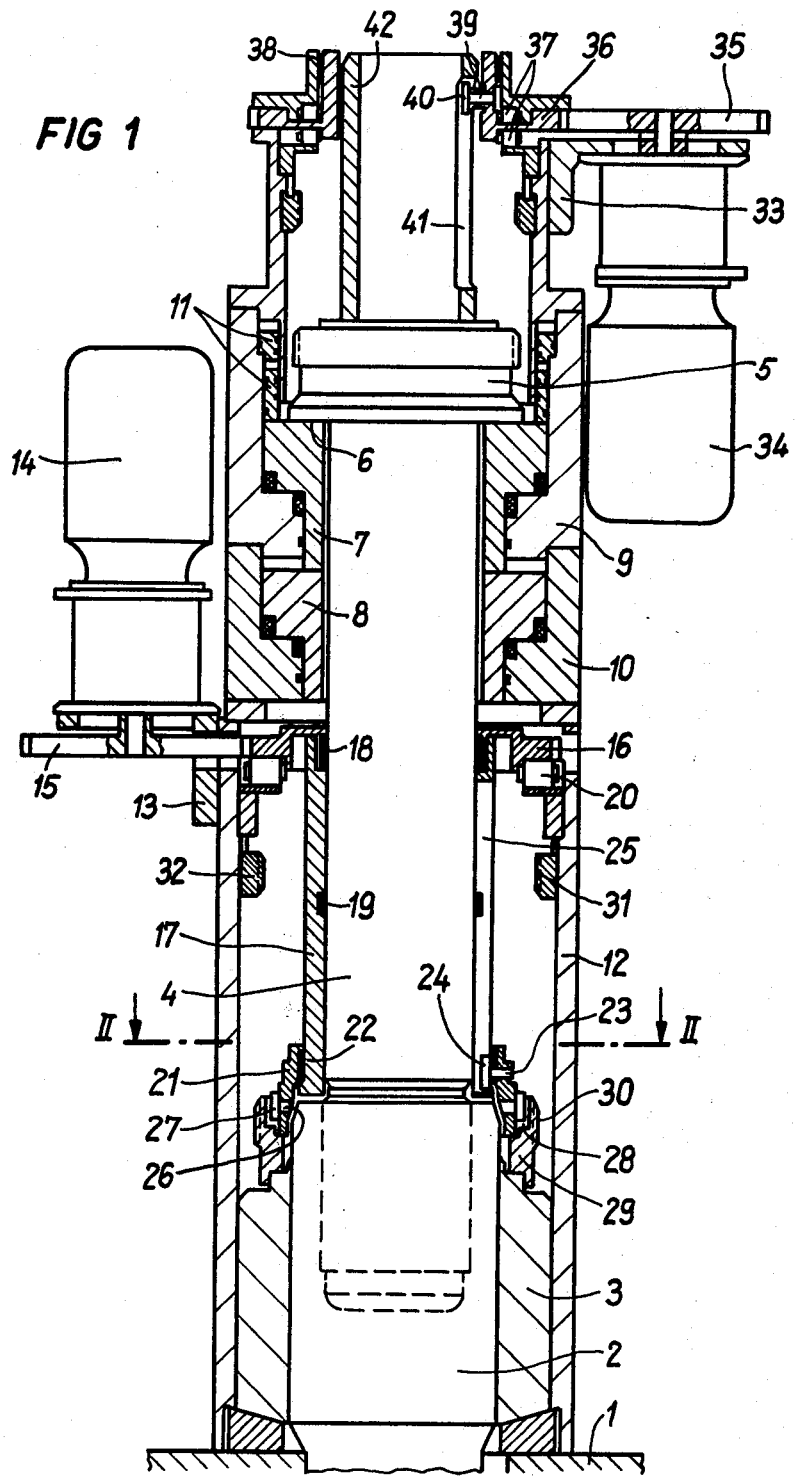
FIG. 1 is a view, in longitudinal cross-section taken along lines I—I of FIG. 2, of an apparatus for turning the nuts, or the tensioning nuts, of several studs arranged on a pitch circle for closing a pressure vessel, according to the teachings of the invention.

Cover 1 of, for instance, a reactor pressure vessel or of a boiler, is opened and closed by means of a multiplicity of studs 2 arranged on a pitch circle which are engaged by like number of nuts 3. A nut 3 consists of a steel cylinder having an internal thread, which is adapted to be automatically screwed on and off of a stud 2 by a tensioning apparatus. The apparatus serves, at the same time, to apply pre-tension to the stud so that cover 1 is pressed onto a contact surface of the pressure vessel. For this purpose, a tensioning bolt 4 is screwed into stud 2. Tensioning bolt 4 passes through the body of the apparatus and has, at its upper end, a widened extension portion 5 which forms a surface 6 for engaging hydraulically operated lifting pistons 7 and 8. Each lifting piston 7 and 8 surrounds the associated tensioning bolt 4, being arranged on top of each other thereon and within corresponding lift cylinders 9 and 10. They are each brought into their starting position by resetting pistons 11.

Support for the apparatus is provided by a support body 12 which has a central space for axially receiving stud 2, tensioning bolt 4, and nut 3. Electric drive motor 14, which serves to drive nut 3 in both directions of rotation, is fastened to support body 12 by means of an angle bracket 13.

To transmit torque from electric motor 14 to nut 3, a pinion 15 on the motor shaft engages a second gear 16 which is fastened to the upper end of a drive bushing 17 and, together with the latter, coaxially surrounds tensioning bolt 4. Instead of a separate gear connected to the drive bushing, the drive bushing could, itself, carry external teeth, but the separate, connectable parts are easier to manufacture. Drive bushing 17, along with second gear 16, is guided on tensioning bolt 4 by slide bearings 18 and 19, so that centering results when the device is put on. Drive bushing 17 and gear 16 are furthermore supported, axially, in support body 12 by needle bearings 20.

At the lower end of drive bushing 17 which faces the nut 3, bushing 17 carries a coupling half 21 which has a bronze guide 22 facing the outside surface of drive bushing 17. Clutch half 21 has radial, inwardly extending dog arms 23, each of which carries a roller 24 and engages in a longitudinal slot 25 of drive bushing 17. Similar dog arms 26, each having a roller 27, also extend radially out of clutch half 21 and engage in associated slots 28 in a second half 29, which, in turn, is fastened to nut 3. Not visible in the drawing are guide surfaces, in the form of inclined planes, which facilitate the engagement of dog arms 26 in slots 28 when the device is put on. Both clutch halves 21 and 29 thus form a positive clutch which transmits torque, regardless of the direction, and which can be pulled apart or pushed together in the axial direction. The torque of electric motor 14 is therefore transmitted to nut 3 via pinion 15, gear 16, drive bushing 17, clutch half 21 and clutch half 29.

When a nut 3 is being screwed off a stud 2, dog arms 23 of clutch half 21 slide upward in longitudinal slots 25 of drive bushing 17, moving together with the other clutch half 29 and nut 3. A thread 30, arranged on the outermost peripheral surface of clutch half 29, engages a counter-thread 31 on the inside of ring 32 when nut 3 is in the end position. Ring 32 is loosely mounted in support body 12 for this purpose. In this way, nut 3, with clutch half 29 connected thereto, is protected against falling out when the tensioning device is being transported. The "transport" protection also facilitates threading nut 3 onto the thread of stud 2, since the threads of the transport protection remain engaged with the nut when it has just been threaded onto the first turns of stud 2.

The above-described arrangement for turning nut 3 on stud 2 can also be used for turning a tensioning nut, which is screwed onto an upper extension of the stud or onto a tensioning bolt, in order to enable direct application of pretension to the stud.

In the illustrated embodiment, however, pretension is applied by stretching stud 2 by means of tensioning bolt 4, which is screwed into it. An electric motor 34 which is fastened to one side of support body 12 on an angle bracket 33 serves for turning tensioning bolt 4. A pinion 35 on the shaft of motor 34 meshes with a gear 36 which is axially supported on support body 12 by means of antifriction bearings 37 and radially supported, by bearings 38. Gear 36 has inward extending dogs (driver arms) 39 each of which carries rollers 40 and each of which is engaged in a longitudinal slot 41 of drive bushing 42. Drive bushing 42 is fastened to tensioning bolt 4 and thus transmits torque directly to it.

What is claimed is:

1. In a device for turning nuts, tensioning nuts, and tensioning bolts on studs arranged on a pitch circle for closing a pressure vessel, in which the stud or a tensioning bolt connected thereto may extend substantially beyond a nut seated on the pressure vessel, the device comprising a tensioning assembly having a central space in a supporting body for receiving a stud, a nut and a tensioning bolt, when one is used, and which carries separate turning units for reversibly driving a pinion meshing with the teeth of a drive bushing held in the support body and surrounding the stud to transmit torque to the nut and for applying tension to the stud, the improvement comprising:

the nut being connected to one half of a positive, torque-transmitting clutch which can be pulled apart in the axial direction, the second half of the clutch being supported for motion lengthwise on the drive bushing while being secured against rotation relative to the bushing; and the drive bushing being guided on the stud and being provided, at the end away from the nut, with external teeth for meshing with the pinion.

2. In a device according to claim 1, the further improvement comprising the second half of the clutch having radial, inwardly extending dog arms which engage in longitudinal slots of the drive bushing.

3. In a device according to one of claim 1 or claim 2, the further improvement comprising the second half of the clutch having radial, outwardly extending dog arms which engage in slots of the clutch half which is connected to the nut.

4. In a device according to claim 2, the further improvement comprising the dog arms carrying rollers.

5. In a device according to claim 3, the further improvement comprising the dog arms carrying rollers.

6. In a device according to claim 1, the further improvement comprising a gear which meshes with the pinion being fastened to one end of the drive bushing.

7. In a device according to claim 1, the further improvement comprising the coupling half which is connected to the nut having a thread on its outer surface for engaging, when the nut is screwed off the stud or the tensioning bolt, a counterthread which is arranged on the inside of a ring loosely disposed in the support body.

* * * * *